No. 780,118. PATENTED JAN. 17, 1905.
F. C. MOSIER.
JARDINIÈRE.
APPLICATION FILED OCT. 31, 1904.

Witnesses
J. P. Britt
E. C. Duffy

Inventor
Frank C. Mosier,
By C. E. Duffy & Son
Attorneys

No. 780,118. Patented January 17, 1905.

UNITED STATES PATENT OFFICE.

FRANK C. MOSIER, OF PITTSTON, PENNSYLVANIA.

JARDINIÈRE.

SPECIFICATION forming part of Letters Patent No. 780,118, dated January 17, 1905.

Application filed October 31, 1904. Serial No. 231,074.

*To all whom it may concern:*

Be it known that I, FRANK C. MOSIER, a citizen of the United States, residing at Pittston, in the county of Luzerne and State of Pennsylvania, have invented certain new and useful Improvements in Jardinières; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to jardinières, and has for its object to provide a device of this class which is particularly designed to be used for landscape decoration and for decorating graves and the like.

A further object of my invention is to provide a jardinière or device for holding either cut flowers or growing plants, which can be placed upon the side of a mound of earth without toppling over and spilling its contents and without resting the base of the jardinière on the grass underneath, thereby allowing the grass to grow and remain green.

A further object of my invention is to provide a jardinière which is so constructed that the body thereof can be lifted and detached from its pedestal in order to be refilled with water, plants, earth, or flowers and without disturbing the pedestal in the ground, so that the body of the jardinière can again be replaced on its pedestal after such filling.

A further object of my invention is to provide a jardinière wherein the bowl or body can be removed from the pedestal and set up and used on a flat surface or compactly stored away and nested for transportation like an ordinary jardinière or flower-pot.

With these objects in view my invention consists in the novel construction of the jardinière, which may be of clay, pottery, glass, porcelain, metal, or any other suitable material, and which will be first fully described and afterward specifically pointed out in the appended claims.

Figure 1:
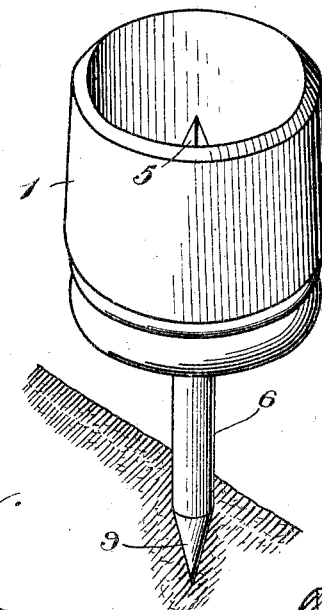
Figure 2:
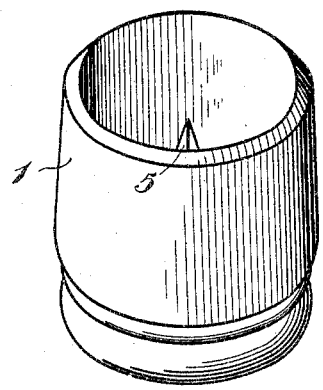
Figure 3:
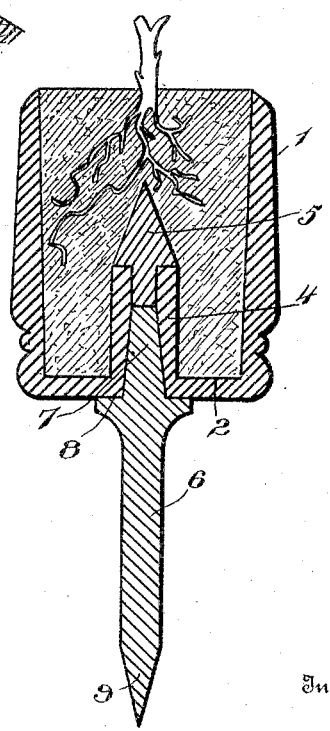
Figure 4:
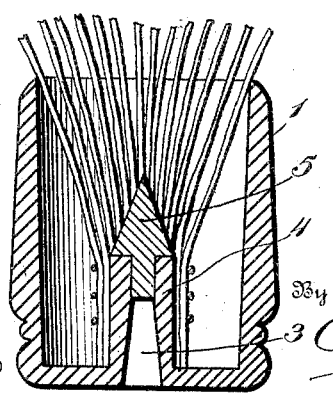

Referring to the accompanying drawings, Figure 1 is a perspective view of the jardinière constructed in accordance with my invention, showing the same in position on a mound of earth. Fig. 2 is a similar view showing the same in the position of setting upright on a flat hard surface. Fig. 3 is a vertical sectional view taken through the jardinière, showing the same holding a growing plant, while Fig. 4 is a similar view showing the method of securing cut flowers within the vessel.

Like numerals of reference indicate the same parts throughout the several figures, in which—

1 indicates the jardinière, which is constructed preferably cylindrical and which may be of any fanciful design or pattern. Referring particularly to Figs. 3 and 4, it will be seen that the bottom 2 of the jardinière is provided with a central tapered opening 3, around which are the small walls 4, a cap or plug 5 being designed to enter the top of the said opening 3 to close the same. A sharp point 6, having a tapered upper end 7, is designed to enter the opening 3 in the bottom of the jardinière, and said point may be provided with a shoulder 8 to limit the entrance of the tapered portion 7 into the opening 3, the bottom portion 9 being sharpened, so as to facilitate its entrance into the earth.

Referring particularly to Fig. 3, which illustrates the jardinière holding a growing plant, it will be seen that the point 6 can be inserted within the opening 3, as shown, and the jardinière can then be safely and conveniently placed upon the side of a mound or hill by simply pushing the point 6 into the earth, as shown in Fig. 1. This construction provides for a very convenient and easily-handled jardinière which can be placed in any desired position for purposes of decoration without the possibility of having the vessel blown over by the wind or accidentally toppled over of its own weight.

Referring now to Fig. 4, which illustrates the jardinière as holding a bunch of cut flowers, (the stems only being illustrated in the figure,) it will be seen that the walls 4 in the bottom of the jardinière provide a means for holding the bunch of cut flowers securely in position within the vessel, the pointed form of the cap or plug 5 allowing the bunch of cut flowers, which has first been wrapped, to be simply pushed down over the sharp cap or plug 6, thus securely holding the flowers in position and preventing them from being disarranged or thrown out by the force of the wind. When the said flowers have withered, the same are taken out of the jardinière by simply grasping the bunch, and a new and fresh bunch can be inserted by simply pressing the tied ends of the stems over the sharp cap or plug 5 and down onto the vertical walls 4, surrounding the tapered opening 3, within which opening the point 6 is adapted to enter.

Having thus described the several parts of my invention, I do not wish to be understood as limiting myself to the exact construction as herein set forth, as various slight changes may be made therein by those skilled in the art which would fall within the limit and scope of my invention, and I consider myself clearly entitled to all such changes and modifications.

What I claim as my invention, and desire to secure by Letters Patent of the United States, is—

1. The combination of the receptacle provided with an opening in the bottom thereof, walls formed surrounding said opening, a cap or plug covering the top of said opening and a point adapted to enter lower end of said opening, whereby the jardinière may be placed on the side of a mound or hill by pressing the said point into the earth, substantially as described and for the purposes set forth.

2. The combination of a vessel provided with an opening in the bottom thereof, a sharp cap or plug adapted to cover the top of said opening and a point adapted to enter lower end of said opening for securing the said vessel in the side of a mound or hill by pressing the said point into the earth, substantially as described and for the purposes set forth.

3. A vessel provided with a sharp pointed member in the bottom thereof, over which cut flowers may be pushed to hold the flowers securely within the vessel, substantially as described and for the purposes set forth.

In testimony whereof I affix my signature in presence of two witnesses.

FRANK C. MOSIER.

Witnesses:
MICHAEL CANNON,
R. L. CANNON.